_United States Patent Office_ 2,755,264
Patented July 17, 1956

2,755,264

PLASTIC COMPOSITIONS CONTAINING CARBONATO NITRILES

William L. Riedeman, Philadelphia, Pa., assignor to Rohm & Haas Company, Philadelphia, Pa., a corporation of Delaware No Drawing. Application December 1, 1954,
Serial No. 472,501

4 Claims. (Cl. 260—30.4)

This invention, which is a continuation-in-part of my application, Serial No. 421,440 filed April 6, 1954, relates to plastic compositions containing carbonato nitriles of the fatty acids which contain 16 to 22 carbon atoms. It relates to plastic compositions which contain, as plasticizers, those nitriles which have 16 to 22 carbon atoms and also contain one or more carbonato groups having the formula

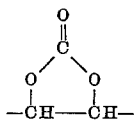

More particularly it relates to vinyl resin compositions which contain carbonato stearonitrile having the formula

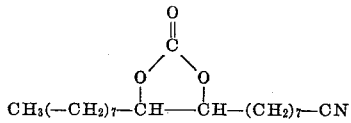

The carbonato nitriles which are employed in this invention are unusually high boiling liquids which are highly compatible with a wide variety of plastic materials. They are the subject of my application, Serial No. 421,440, referred to above. By virtue of the presence of the carbonato groups in the fatty acid chains, they are far more compatible with plastic materials, such as cellulosic esters and vinyl halide resins than are the corresponding nitriles which do not contain carbonato groups. Accordingly, they are eminently suitable for use as plasticizers in plastic compositions.

The carbonato nitriles which are employed in this invention can be made by at least two methods. In one process, phosgene is reacted with a nitrile containing at least two hydroxyl groups on adjacent carbon atoms. Hydrogen chloride is split out and, therefore, the reaction is best carried out in the presence of an acceptor for hydrogen chloride. In another process, the same kind of polyhydroxylated nitrile is reacted with a dialkyl carbonate, such as dimethyl carbonate or diethyl carbonate by ester-interchange in the presence of a catalyst, such as metallic sodium or an alkali metal alkoxide. In either process, the reacting material is a nitrile which contains one or more pairs of hydroxyl groups on adjacent carbon atoms of the aliphatic chain. Such intermediate polyhydroxy nitriles are made by known methods. For example, a nitrile of an unsaturated acid which contains one or more double bonds is reacted with hydrogen peroxide and a large excess of formic acid or acetic acid whereby an hydroxyacyloxy derivative is produced. This, in turn, is converted to the polyhydroxy compound by hydrolysis of the acyloxy group or by alcoholysis.

It is now evident that the materials, from which the carbonato plasticizers are made, are nitriles of acids which contain 16 to 22 carbon atoms and also contain one or more double bonds. Typical of such nitriles are oleonitrile, eruconitrile, elaeostearonitrile, linoleonitrile, linolenonitrile, clupanodononitrile, and palmitoleonitrile. All of these are the nitriles of unsaturated fatty acids which occur in animal and vegetable oils, for example, in soybean, rapeseed, linseed, sardine and whale oils. This invention also embraces the use of mixtures of nitriles such as those made from mixtures of fatty acids. Since all of the nitriles of the naturally occurring unsaturated fatty acids contain aliphatic unsaturation, they can readily be converted first to the polyhydroxy derivatives and thereafter to the carbonato products. It is preferred that all of the double bonds in any given nitrile be converted to carbonato groups. It has been found, however, that the carbonato group imparts to a nitrile such greatly enhanced solubility in, and compatibility with, plastic materials, particularly of the vinyl resin type, that it is not essential that every double bond be converted to a carbonato group. It is essential, however, that at least one double bond in each nitrile be thus converted.

The carbonato nitrile which has the greatest commercial value at the moment is 9,10-carbonatostearonitrile having the formula

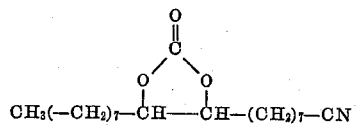

The reaction of phosgene with the polyhydroxy nitriles is best carried out at a temperature from −10° C. to the boiling point of the reaction mixture. In commercial practice, it is preferred to carry out the reaction at a temperature from about −10° C. to about 60° C. because of the volatility of the phosgene. The phosgene may be bubbled into the nitrile; but a more satisfactory method appears to be that of reacting the nitrile with a solution of phosgene in an organic liquid, such as benzene, which is a solvent for the nitrile. It is more desirable that a mildly basic acceptor for hydrogen chloride be present; and for this purpose tertiary amines and weakly basic anion-exchange resins have each been used. Pyridine is very effective and its use is recommended at lower temperatures while anion-exchange resins are best used at higher temperatures. Other tertiary amines which can be used like pyridine include quinoline, isoquinoline, dimethylaniline, diethylaniline, trimethylamine, triethylamine, tri-n-butylamine, and the like. What is desired is that an acceptor be present which will take up the hydrogen chloride as fast as it is formed. In the process of preparing the carbonato nitriles by ester-interchange, the nitrile is reacted with an alkyl carbonate at a temperature which is high enough to cause the alcohol to distill out of the reaction mixture. Here, as in the phosgene reaction, the use of a solvent, such as an aromatic hydrocarbon is recommended or an excess of the alkyl carbonate itself may serve as a solvent. Alkali metals, such as sodium and potassium, serve as excellent catalysts. Metal alkoxides have also been used.

The plastic compositions of this invention which contain the carbonato nitriles are flexible, tough and stable. The carbonato nitriles are extremely compatible with plastics—particularly with vinyl resins—and give rise to plasticized compositions which are extremely stable. Various quantities of the carbonato nitriles can be employed, depending on the degree of plasticization which is required and also depending on the amount and kinds of other materials, such as fillers and extenders which may be present. While as little as 10% of a carbonato nitrile, based on the combined weight of the plastic material to be plasticized and said nitrile, exerts a softening effect, it is recommended that larger amounts be used. Thus in the preparation of unfilled and unpigmented compositions of high flexibility, the amount of the carbonato nitrile which is employed is of the order of 35% to 50%, on the same basis, when the carbonato nitrile is the sole plasticizer.

Other modifiers, such as dyes, pigments, extenders, mold lubricants, stabilizers and other plasticizers, including resinous plasticizers, can be present in the plastic compositions without departing from the spirit of this invention, which invention is one of providing plastic compositions containing carbonato nitriles such as are described above.

The vinyl resins which are plasticized to advantage by the carbonato nitriles of this invention are more properly defined as "vinyl halide resins" and this term is herein used to embrace the following: polymers of a vinyl halide, such as polyvinyl chloride or polyvinyl bromide; copolymers of a vinyl halide and a vinyl ester of a lower aliphatic acid, such as copolymers of vinyl chloride and vinyl acetate or vinyl propionate; copolymers of vinyl halides and vinylidene halides, such as copolymers of vinyl chloride and vinylidene chloride; and copolymers of a vinyl halide with other copolymerizable compounds containing a vinylidene group, $CH_2=C<$, such as ethyl acrylate, methyl methacrylate and the like. Preferred resins of this type are those which contain from about 60% to about 95% of copolymerized vinyl chloride and 5% to 40% of another copolymerized vinyl or vinylidene compound.

The following examples illustrate this invention. The examples are drawn to the preparation and use of 9,10-carbonato stearonitrile; but it is to be understood that the other nitriles embraced by this invention are prepared in the same manner and are employed in the same way in plastic compositions.

EXAMPLE 1

Into a reactor equipped with thermometer, agitator and condenser were charger 79 grams of 9,10-dihydroxy-stearonitrile (0.267 mole), 47.2 grams of diethyl carbonate and a small piece of metallic sodium. The stirred mixture was heated to 96° C. and held at the boiling point until the liberation of ethyl alcohol ceased. The mixture was then cooled to room temperature and was dissolved in 750 ml. of benzene. The solution was thoroughly washed with water and concentrated on a steam bath under a vacuum. The resultant oil was twice fractionally distilled and 63 grams of an oil was collected which boiled at 228°–234° C./0.1 mm. Its index of refraction ($n_D^{25}$) was 1.4630 and its analysis corresponded to that of 9,10-carbonatostearonitrile (percent C: theory=70.54, analysis=70.38; percent H: theory=10.29, analysis=10.13; percent N: theory=4.33, analysis=4.17).

EXAMPLE 2

A mixture of 70 grams of dihydroxystearonitrile (0.235 mole), 200 grams of benzene and 110 grams of a commercially available, weakly basic anion-exchange resin was placed in a reactor equipped with thermometer, stirrer, reflux condenser and dropping funnel. To the stirred mixture was added dropwise over a period of about 30 minutes a solution of 47 grams of phosgene dissolved in 150 grams of benzene. The temperature rose to about 42° C. and after the addition of phosgene the mixture was maintained at 50° C. for 2.75 hours. The anion-exchange resin was removed by filtration and the filtrate was washed, concentrated and distilled as in Example 1. The product was essentially identical with the product of the first example.

EXAMPLE 3

A thermoplastic composition was prepared by fluxing and milling at 325° F. the following materials: 60 parts of polyvinyl chloride (Geon 101); 40 parts of carbonato-stearonitrile, prepared as above described; 1 part of tribasic lead sulfate as a stabilizer; and 0.5 part of stearic acid as a lubricant.

Another thermoplastic composition was made for purposes of comparison by the process described immediately above with the exception that 40 parts of dioctyl phthalate, a widely used plasticizer, was employed in place of the carbonatostearonitrile. The two compositions were subjected to the following tests:

1. *Shore hardness.*—A Shore "A" Durometer, under a weight of three pounds is applied to the test specimens. A recording is made at once and after 10 seconds; and the hardness is expressed by the two values, the first of which is the higher.

2. *Gasoline extraction.*—Weighed samples are immersed in white, lead-free gasoline at 25° C. for 60 minutes, after which they are thoroughly dried and re-weighed. The loss in weight, expressed as the percentage of the original weight, is a measure of the amount of plasticizer which has been extracted by the gasoline.

3. *Activated carbon volatility.*—Individual specimens are placed between 2" layers of activated charcoal in sealed glass jars which are maintained at 90° C. for 24 hours. The specimens are removed, dusted free of carbon, and re-weighed. Here again the loss in weight is a measure of the amount of plasticizer which has been removed by the carbon.

4. *Fade-O-Meter test.*—Specimens are exposed in an Atlas Fade-O-Meter at 110° F. and changes in their appearance are recorded.

The results of these tests performed on the two above-described compositions are here tabulated:

*Tabulation*

| Test | Composition Containing Carbonato-stearonitrile | Composition Containing Dioctyl Phthalate |
|---|---|---|
| Hardness | 59–55 | 70–65 |
| Gasoline Extraction (loss) percent | 9.8 | 23.0 |
| Activated Charcoal (loss) do | 1.3 | 7.3 |
| Fade-O-Meter: | | |
| Definite Tack hours | ca. 45 | ca. 45 |
| Definite Discoloration do | ca. 45 | ca. 45 |

As is evident from the above tabulation, carbonato-stearonitrile is a good plasticizer for polyvinyl chloride compositions. It provides compositions which are characterized by exceptional stability. Furthermore, all of the compositions embracing vinyl resins and the carbonato nitriles described above display the same desirable properties.

I claim:

1. A composition comprising a vinyl halide resin and, as a plasticizer therefor, a carbonato nitrile of a fatty acid which contains 16 to 22 carbon atoms and which also contains from one to three substituent carbonato groups.

2. A composition comprising polyvinyl chloride and, as a plasticizer therefor, a carbonato nitrile of a fatty acid which contains 16 to 22 carbon atoms and which also contains from one to three substituent carbonato groups.

3. A composition comprising a vinyl halide resin and, as a plasticizer therefor, 9,10-carbonatostearonitrile.

4. A composition comprising polyvinyl chloride and, as a plasticizer therefor, 9,10-carbonatostearonitrile.

No references cited.